US012806779B2

(12) United States Patent
Sundararajan et al.

(10) Patent No.: US 12,806,779 B2
(45) Date of Patent: Nov. 24, 2026

(54) PREDICTIVE PREVENTION OF ROBOTIC PRIVACY OVERREACH

(71) Applicant: International Business Machines Corporation, Armonk, NY (US)

(72) Inventors: Mukundan Sundararajan, Bangalore (IN); Hamid Majdabadi, Ottawa (CA); Jeremy R. Fox, Georgetown, TX (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 18/343,165

(22) Filed: Jun. 28, 2023

(65) Prior Publication Data

US 2025/0001601 A1 Jan. 2, 2025

(51) Int. Cl.
*B25J 9/16* (2006.01)
*G06V 10/764* (2022.01)

(52) U.S. Cl.
CPC ........... *B25J 9/1666* (2013.01); *B25J 9/1697* (2013.01); *G06V 10/764* (2022.01)

(58) Field of Classification Search
CPC ...... B25J 9/1676; B25J 9/1697; B25J 9/1666; A47L 11/24; A47L 11/4066; A47L 2201/04; G06V 10/765; G06V 10/764
See application file for complete search history.

(56) References Cited

U.S. PATENT DOCUMENTS 10,922,553 B2 2/2021 Varerkar
11,192,260 B2 12/2021 Schwarz
2014/0067121 A1 3/2014 Brooks
2014/0142757 A1* 5/2014 Ziegler .................. B25J 9/1697 901/1
2014/0277723 A1 9/2014 Nishimura
2018/0338116 A1* 11/2018 Nishikawa .......... H04L 65/4038
(Continued)

OTHER PUBLICATIONS

Guo, “A Roomba recorded a woman on the toilet. How did screenshots end up on Facebook?”, MIT Technology Review, 28 pps., Dec. 19, 2022, <https://www.technologyreview.com/2022/12/19/1065306/roomba-irobot-robot-vacuums-artificial-intelligence-training-data-privacy/>.

(Continued)

*Primary Examiner* — Khoi H Tran
(74) *Attorney, Agent, or Firm* — Harrity & Harrity, LLP

(57) ABSTRACT

Provided is a computer-implemented method, system, and computer program product for predictively preventing robotic devices from privacy overreach through object detection amelioration. A processor may train a machine learning model, using training image data and risk-based profiling data, to identify personal privacy boundaries within one or more environments. The processor may deploy the machine learning model to a robotic device, where the robotic device includes sensors to generate image data for a first environment of the robotic device. The processor may input the image data for the first environment to the machine learning model. The processor may analyze, using the machine learning model, the image data to identify an object and/or area associated with a personal privacy boundary. The processor may classify, using the machine learning model and based on the analyzing, the object and/or area as being associated with the personal privacy boundary.

16 Claims, 6 Drawing Sheets

(56) References Cited

U.S. PATENT DOCUMENTS

| | | | | |
|---|---|---|---|---|
| 2019/0387203 | A1* | 12/2019 | Sue | H04N 7/185 |
| 2020/0285248 | A1* | 9/2020 | Kim | G06T 7/70 |
| 2021/0153707 | A1 | 5/2021 | Kawai | |
| 2021/0342479 | A1* | 11/2021 | Schluntz | H04L 63/107 |
| 2022/0288781 | A1* | 9/2022 | Schoessler | B25J 9/1651 |
| 2023/0173658 | A1* | 6/2023 | Duthaler | A47L 11/4011 700/245 |
| 2024/0077870 | A1* | 3/2024 | Park | A47L 11/4011 |
| 2024/0398303 | A1* | 12/2024 | Wang | G16H 50/50 |

OTHER PUBLICATIONS

Hardawar, "iRobot's latest Roomba can detect pet poop (and if it fails, you'll get a new one)", Sep. 9, 2021, 4 pps., Engadget, <https://www.engadget.com/irobot-roomba-j-7-object-poop-detection-040152887.html>.

Jalaeian-F et al., "Internal Model impedance control for a lower limb rehabilitation robot in the presence of uncertainty", 26th Iranian Conference on Electrical Engineering (ICEE2018), 6 pps.

Lee et al., "Reliable software architecture design with EtherCAT for a rescue robot", 2016 IEEE International Symposium on Robotics and Intelligent Sensors (IRIS), IEEE, 2016, 6 pps.

Martin, "What Is Simultaneous Localization and Mapping?", Jul. 25, 2019, 4 pps., <https://blogs.nvidia.com/blog/2019/07/25/what-is-simultaneous-localization-and-mapping-nvidia-jetson-isaac-sdk/>.

Qiu et al., "Reinforcement Learning of Serpentine Locomotion for a Snake Robot", 2021 IEEE International Conference on Real-time Computing and Robotics (RCAR), IEEE, Jul. 15-19, 2021.

Wu, "Privacy and Security in Robotics and AI Systems", Copyright © 2019-2021 Silicon Valley Law Group, 2 pps., <https://www.airoboticslaw.com/blog/privacy-and-security-in-robotics-and-ai-systems>.

Zhou et al., "Goal-Directed Navigation with a Hybrid Planning Strategy Through Learning from Vision", Journal of Physics: Conference Series. vol. 1757, No. 1., IOP Publishing, 2021, 7 pps.

* cited by examiner

400

```
# Import necessary modules
from sklearn.ensemble import RandomForestClassifier
from sklearn.datasets import fetch_openml
from sklearn.model_selection import train_test_split
import numpy as np

# Fetch a set of data
data = fetch_openml(‘privacy_data’)

# Split the dataset into training and testing stets
X_train, X_test, y_train, y_test = train_test_split (data.data, data.target, test_size=0.2,
random_state=42)

# Create the Random Forest Classifier
clf = RandomForestClassifier(n_estimators=100)

# Train the model on the training data
clf.fit(X_train, y_train)

# Make predictions on the test data
predictions = clf.predict(X_test)

# Calculate the accuracy of the model
accuracy = np.mean(predictions == y_test)

# Print the accuracy
print(“The model’s accuracy is: “, accuracy)
```

FIG. 4

PREDICTIVE PREVENTION OF ROBOTIC PRIVACY OVERREACH

BACKGROUND

The present disclosure relates generally to the field of robotic devices and, more specifically, to using machine learning to predictively prevent robotic devices from privacy overreach through object detection amelioration.

The current state of robotics technology leaves much to be desired in terms of safety and reliability. When navigating through unknown environments, robotic devices are unable to accurately identify and avoid potential privacy risks, safety issues, and tripping hazards. This leaves them vulnerable to creating potential privacy invasions and/or personal injury.

SUMMARY

Embodiments of the present disclosure include a computer-implemented method, system, and computer program product for predictively preventing robotic devices from privacy overreach through object detection amelioration. A processor may train a machine learning model, using training image data and risk-based profiling data, to identify personal privacy boundaries within one or more environments. The processor may deploy the machine learning model to a robotic device, wherein the robotic device includes sensors to generate image data for a first environment of the robotic device. The processor may input the image data for the first environment to the machine learning model. The processor may analyze, using the machine learning model, the image data to identify an object and/or area associated with a personal privacy boundary. The processor may classify, using the machine learning model and based on the analyzing, the object and/or area as being associated with the personal privacy boundary.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 4 illustrates an example code snippet for implementing a risk-based profiling feature for a robotic device, in accordance with some embodiments of the present disclosure.

Figure 1:
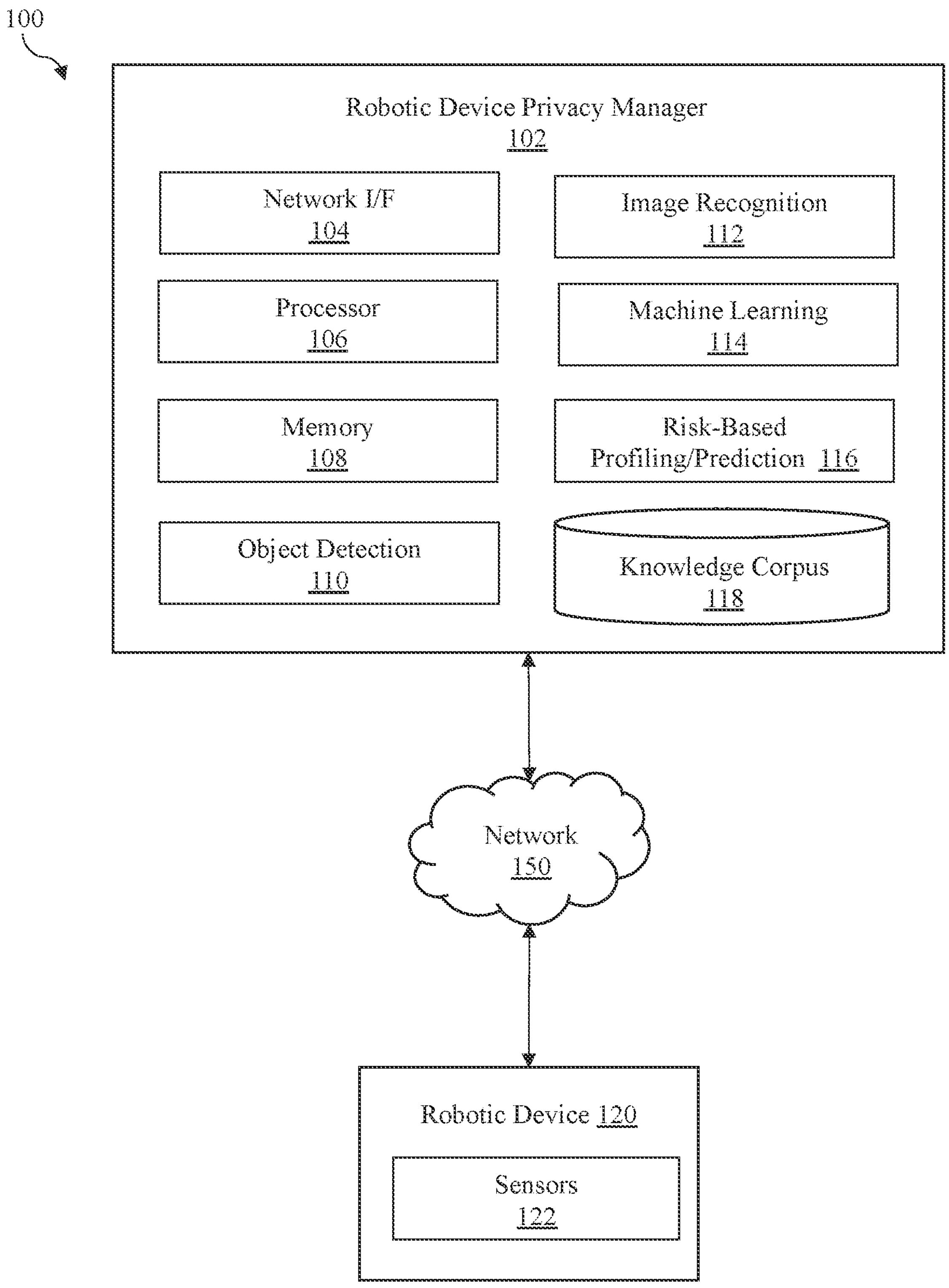
FIG. 1 illustrates an example robotic device privacy management system, in accordance with some embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of robotic devices and, more particularly, to using machine learning to predictively prevent robotic devices from privacy overreach through object detection amelioration. While the present disclosure is not necessarily limited to such applications, various aspects of the disclosure may be appreciated through a discussion of various examples using this context.

The current state of robotics technology leaves much to be desired in terms of safety and reliability. When navigating through unknown environments, robotic devices are unable to accurately identify and avoid potential privacy risks, safety issues, and tripping hazards. This leaves them vulnerable to creating potential privacy invasions and/or personal injury. As a result, there is a need for a solution that can predictively prevent robotic overreach pertaining to personal invasion of privacy. The inventive concept of the present disclosure seeks to address this need by leveraging machine learning and pattern recognition to enable a robotic device to know when and where not to perform its given tasks. To do so, the present disclosure utilizes an ensemble decision tree model, also known as a random forest, for image classification pertaining to privacy. This type of machine learning model is well suited for the task because it can process large amounts of ordinal data and provides accurate predictions.

The present disclosure further includes a risk-based profiling feature to identify potential issues of privacy for a given user or individual. This feature will be powered by a combination of computer vision, natural language processing, and machine learning algorithms. Using these features, robotic devices can be programmed to recognize and respond to various objects in their environment using predictive analytics. This enables the robotic device(s) to detect and avoid potential privacy risk(s)/boundaries, safety issues, and tripping hazards. The combination of these technologies will allow the robotic device to make smart decisions about where it can and cannot go, ensuring that it can protect people's privacy and safety.

As described in the present disclosure, robotic devices can be programmed to recognize and respond to various objects in their environment using predictive analytics. This concept of predictively preventing robotic privacy overreach goes together with the development and improvement of modern robotics technology. By utilizing artificial intelligence and machine learning algorithms, robotics technology can detect objects and recognize images, allowing it to accurately identify and avoid potential privacy risks. This technology is essential for the development of more advanced robotic devices that can respond to their environment and make smarter decisions based on the given situation.

Embodiments of the present disclosure include a system, computer-implemented method, and computer program product that utilize machine learning and pattern recognition to enable a robotic device(s) to know when and where not to operate by identifying sensitive spaces amongst private, quasi-public, public, and public-in-range environments. The system may utilize various detection, image recognition, and machine learning algorithms to make predictions related to privacy and instruct the robotic device to execute tasks based on those predictions. The system may leverage a variety of technologies, such as neural networks and artificial intelligence to make informed robotic decisions for performing various tasks that may intrude on privacy of uses and/or spaces. The system may perform risk-based profiling to identify potential personal privacy concerns, safety issues, and tripping hazards and guide the given robotic device through predictable motions marking visual detection of a personal privacy boundary in which it is dynamically programmed to avoid.

In embodiments, methods may include configuring the system architecture related to the robotic device. This includes establishing the necessary IT infrastructure and establishing the necessary file systems, databases, and networks. In embodiments, the system may be configured to store and process data, construct the required networks for data transfer, and create the needed databases for storing and retrieving data. For example, the system architecture could consist of a data warehouse, a messaging queue, and a distributed database system.

In embodiments, once the system architecture is configured, an installation of necessary software is performed. This includes installing the necessary operating systems, machine learning and pattern recognition tools and/or algorithms, and any other necessary software. This may include installing the necessary software, such as the robotic device's operating system, software for machine learning and pattern recognition, and any other necessary software. For example, the robotic device's operating system could be Linux® operating system, and the machine learning and pattern recognition software could be configured as TensorFlow® or PyTorch®. However, these examples are not meant to be limiting.

In some embodiments, the system may require integrating additional necessary technologies. For example, this may include integrating neural networks and/or artificial intelligence into the system to enable the robotic device to accurately detect objects and recognize images. This may include integrating necessary technologies, such as neural networks, computer vision, and natural language processing, into the system. For instance, neural networks could be used to identify objects, and computer vision could be used to recognize images. However, these examples are not meant to be limiting.

In embodiments, the system may train a machine learning model to identify personal privacy boundaries within one or more environments. The machine learning model may include machine learning algorithms and pattern recognition models. The machine learning model may include training for developing the necessary algorithms for object detection, image recognition, and risk-based profiling, and integrating the machine learning and pattern recognition models into the system. For example, the machine learning model may include an ensemble decision tree algorithm (e.g., random forest) for image classification pertaining to personal privacy boundaries, and a risk-based profiling feature powered by a combination of computer vision, natural language processing, and machine learning algorithms. In embodiments, the machine learning model is trained with a large training dataset. This may include gathering or collecting relevant images for training. For example, the system may collect a large dataset of images relevant to the environment in which the robotic device will be navigating, such as images of people, furniture, and other objects. The system may then perform image labeling. For example, the system will label the images with appropriate tags that describe the objects in the images (e.g., distinguishing recognized objects as private, sensitive, hazardous, identifying a predetermined boundary around recognized objects, etc.). This can be done through manual labeling, automated tagging, or natural language processing. The system may train the machine learning model with the labeled images. For example, the system may use the labeled images to train a machine learning model, such as an ensemble decision tree. This model is well suited for the task because it can process large amounts of ordinal data and provides accurate predictions.

In embodiments, the trained machine learning model may be used to make predictions about objects in the images. For example, the machine learning model may be trained to recognize various environments, areas, boundaries, and/or objects that may be classified as sensitive and/or private, such that the given robotic device does not generate data regarding or within a proximity to those environments, areas, or objects. For example, training image data may include images of example confidential areas (e.g., conference rooms, bathroom areas, changing rooms, sensitive equipment, etc.), sensitive documents (e.g., electronic documents on computer screens), persons/users, tripping hazards or objects (e.g., furniture), etc., where the machine learning model uses various image recognition and classification algorithms that can recognize those environments, areas, hazards, and/or objects as private/sensitive. Using these classifications, the machine learning model may be trained to avoid generating data regarding these objects such that no private information or data is generated by the robotic device. In embodiments, the machine learning model may be trained to avoid a personal privacy boundary. The personal privacy boundary may be a predetermined area or distance that the robotic device is to stay away from a recognized private/sensitive area or object. In this way, the machine learning model is trained with image data including objects/areas that a robotic device is meant to avoid.

In embodiments, the system may include program code configured to process data, identify patterns, and make predictions using machine learning and pattern recognition models regarding personal privacy boundaries. This includes using supervised machine learning algorithms to process data from images and classify objects in new images. The models may be integrated with necessary data structures and algorithms to enable the models to process data and make predictions. This includes developing a database to store the models and creating a system to integrate them into the application.

In embodiments, the machine learning model may be trained with risk-based profiling data including body language information associated with an identified personal privacy boundary, and situational awareness information associated with the personal privacy boundary. For example, the machine learning model may be trained to use facial expression recognition algorithms to identify when a user may display a facial expression (e.g., concerned, anger, annoyance, etc.). indicating they do not want to be near or followed by the robotic device. In another example, the machine learning model may be trained to avoid areas based on situational awareness. For example, training may include situational image data showing a user or human going towards a defined sensitive area such as a bedroom, changing room, bathroom, secure conference room, and the like. In another example, the machine learning model may be trained to use natural language processing algorithms to analyze building maps, blueprints, and/or meeting schedules, such that the robotic is trained to avoid labeled areas that are classified as private or sensitive as it traverses the given environment. For example, the machine learning model may utilize descriptions of various rooms from a building map and instruct a robotic device (e.g., cleaning robotic device) to avoid those areas while a sensitive/confidential meeting is occurring.

In embodiments, the system may be tested in a variety of environments to ensure that it is functioning correctly. This requires testing the system in a variety of environments, such as indoor and outdoor settings, to make sure that it is functioning correctly. For example, the robotic device could be tested in a variety of indoor and outdoor settings to make sure that it is accurately detecting objects and recognizing images (e.g., recognizing personal privacy boundaries, personal privacy situations, and the like). In embodiments, the system may perform validation of the risk-based profile via testing. For example, this may include testing the application with a variety of images (e.g., personal privacy related images, boundaries, potential hazards, etc.) to ensure it is accurately detecting and identifying objects and safety issues.

In embodiments, once tested/validated, the system may deploy the trained machine learning model to a robotic device, where the robotic device includes sensors that generate image data for an environment where the robotic device is operating. The machine learning model may be deployed to the robotic device(s) using a cloud computing network. In embodiments, the robotic device may be any type of robotic device that generates image data and/or sensitive data (e.g., audio, textual, multimedia data). For example, the robotic device may be a premises monitoring robotic device (e.g., roaming security robotic device), a debris cleaning robotic device (e.g., robotic vacuum, window cleaning robotic device, sanitation robotic device), an unmanned aerial vehicle (UAV), and the like. It is contemplated that many other robotic devices exist which the present disclosure may be applied, and that these examples are not meant to be limiting. The environment may be any type of area or space that the robotic device is performing one or more task. For example, the environment may be a secure environment (e.g., bank, corporate office, private home area, etc.) where the robotic device is performing cleaning tasks.

In embodiments, as the robotic device performs its tasks, the machine learning model inputs the image data generated as the robotic device operates in the environment. The machine learning model analyzes the image data of the environment to identify an object and/or area associated with a personal privacy boundary. For example, the machine learning model may automatically and continuously analyze the robotic device's image data stream to determine if the robotic device is coming within proximity to a recognized private/sensitive area and/or object. Based on the analyzing, if the machine learning model identifies/recognizes an area or object as being private/sensitive (based on trained images), then it will classify the object and/or area as being associated with the personal privacy boundary.

In embodiments, the machine learning may instruct the robotic device to avoid the personal privacy boundary based on the classification of the object/area as being associated with the personal privacy boundary. For example, this may include avoiding coming within a predefined distance (e.g., 10 feet, 50 feet, etc.) of the object, avoiding crossing the personal privacy boundary associated with the area (e.g., door threshold of a room/area deemed private), avoiding collecting any data (e.g., image data, audio data, textual data, and the like) with respect to the personal privacy boundary associated with the object (e.g., person, computer, etc.) and/or area, and/or avoiding the personal privacy boundary based on a predetermined schedule (e.g., avoiding a room based on a user schedule).

In some embodiments, the system may use the machine learning model to identify a task to be performed by the robotic device within the environment and modify the task based on the personal privacy boundary. Once modified, the machine learning model may instruct the robotic device to perform the modified task. For example, a robotic device may be scheduled to perform cleaning tasks in an environment such as a bathroom or bedroom. However, the machine learning model may identify that the task to be performed may intrude on an identified personal privacy boundary within the environment. For example, the machine learning model may use an ensemble decision tree algorithm to classify the environment (bedroom/bathroom) as a personal privacy boundary because of the presence of a user. In response, the machine learning model may adjust the tasks of the robotic device to clean an alternative room until the user is identified as not present in the environment.

In embodiments, the system may utilize the machine learning model to verify that the movements in the identified public spaces or environments are predictable such as auto-slowing down when being near to humans or approaching a space boundary and when the visual boundary indicator reaches the public space boundary. The machine learning model will be able to classify objects based on the labels assigned to the images. In some embodiments, the machine learning model may be refined by evaluating the model's predictions and adjusting the model as needed to improve its accuracy. This can be done by validating the model's predictions against known labels and adjusting the model accordingly.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example robotic device privacy management system 100 in which illustrative embodiments of the present disclosure may be implemented. In the illustrated embodiment, the robotic device privacy management system 100 includes robotic device privacy manager 102 that is communicatively coupled to robotic device 120 via network 150. In embodiments, robotic device privacy manager 102 and robotic device 120 may be configured as any type of computer system and may be substantially similar to computer system 501 of FIG. 5.

In embodiments, network 150 may be any type of communication network, such as a wireless network, edge computing network, a cloud computing network, or any combination thereof (e.g., hybrid cloud network/environment). Consistent with various embodiments, a cloud computing environment may include a network-based, distributed data processing system that provides one or more edge/network/cloud computing services. Further, a cloud computing environment may include many computers (e.g., hundreds or thousands of computers or more) disposed within one or more data centers and configured to share resources over network 150. In some embodiments, network 150 may be substantially similar to computing environment 600 of FIG. 6.

In some embodiments, network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium. For example, robotic device privacy manager 102 may communicate with robotic device 120 using a WAN, one or more hardwire connections (e.g., an Ethernet cable), and/or wireless communication networks. In some embodiments, the various systems may be communicatively coupled using a combination of one or more networks and/or one or more local connections. For example, robotic device privacy manager 102 may communicate with robotic device 120 through a hardwired connection or a wireless communication network.

In embodiments, robotic device privacy manager 102 includes processor 106 and memory 108. The robotic device privacy manager 102 may be configured to communicate with robotic device 120 through an internal or external network interface 104. The network interface 104 may be, e.g., a modem or a network interface card. The robotic device privacy manager 102 may be equipped with a display or monitor. Additionally, the robotic device privacy manager 102 may include optional input devices (e.g., a keyboard, mouse, scanner, or other input device), and/or any commercially available or custom software (e.g., browser software, communications software, server software, machine learning software, natural language processing/understanding software, search engine and/or web crawling software, filter modules for filtering content based upon predefined parameters, etc.).

In some embodiments, the robotic device privacy manager 102 may include object detection component 110, image recognition component 112, machine learning component 114, risk-based profiling/prediction component 116, and knowledge corpus 118.

In embodiments, object detection component 110 may be configured to detect one or more objects within an environment that are in proximity to robotic device 120. For example, sensors 122 may include one or more cameras that generate image data from an environment where robotic device 120 is operating, running, performing tasks, and the like. Object detection component 110 may detect a user (e.g., object) is present within the environment by analyzing image data that is generated by sensors 122. In another example, the object detection component 110 may detect one or more hazardous objects within proximity of the robotic device 120 by analyzing image data generated from sensors 122 of robotic device 102.

In embodiments, image recognition component 112 is configured to identify various objects detected from image data generated by robotic device 120. That image data may be sent over network 150 where it is analyzed by image recognition component 112. In some embodiments, the image recognition analysis is performed by machine learning software, such as, facial expression recognition, vector feature extraction, and/or IBM Watson® technology (all IBM Watson® based trademarks and logos are trademarks or registered trademarks of International Business Machines Corporation and/or its affiliates). In some embodiments, the determination of the recognized object or area is determined by comparing extracted features (e.g., facial features, object features, area features) of the detected object to labeled training process images and determining the highest percentage match of the detected object compared to the training images. In some embodiments, this may be determined by utilizing a confidence interval which may be set by a user or determined/adjusted by the system during training. The confidence interval will be used to determine the probability that the detected recognized image is substantially similar to the labeled training image. The robotic device may use the recognized image to update its prediction model and adjust the confidence interval. For example, the robotic device may add the captured image to its training images, and it may weigh the captured image more heavily than other images during training because it was previously incorrectly analyzed based on user feedback.

In embodiments, risk-based profiling/prediction component 116 is configured to generate algorithms that identify potential safety issues and tripping hazards based on detected/recognized objects/areas. In embodiments, risk-based profiling/prediction component 116 may utilize various components (e.g., object detection component 110, image recognition component 112, and/or machine learning component 114) when generating algorithms. In some embodiments, risk-based profiling/prediction component 116 uses convolutional neural networks to detect objects and natural language processing algorithms to identify safety risks. In some embodiments, risk-based profiling/prediction component may include code to process the data from the risk-based profiling feature and make decisions about where the robotic device can and cannot go. This could involve creating a system to receive data from the profiling feature and make decisions from the data.

In embodiments, risk-based profiling/prediction component 116 may perform testing and validation to determine accuracy of the predictions. This may require testing the application with a variety of images to ensure it is accurately detecting and identifying objects and safety issues. As an example, if user may be carrying boiling water across the room, the robotic device can detect this via image recognition and classification and avoid the area based on risk to prevent any potential accidents from occurring. In another example, a robotic device that may include microphones may identify sensitive information is being discussed (using natural language processing) by various persons within proximity of the robotic device and modify its tasks (e.g., deactivate microphones, move to an area out of the range of the discussion). In this way, the application solution will enable the robotic device to accurately identify and avoid potential privacy risks, safety issues, and tripping hazards while navigating through unknown environments.

In embodiments, knowledge corpus 118 is configured to store, provide access to, and/or update data used for making decisions related to predictively preventing robotic device privacy overreach when performing various tasks at the given environment where the robotic device is operating. Knowledge corpus 118 may comprise various forms of data such as historical image data, risk profiling data, hazard data, body language data/pattern recognition, and/or situational awareness data.

In embodiments, machine learning component 114 is configured to use machine learning algorithms to improve is assignment capabilities automatically through experience and/or repetition without procedural programming. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

In embodiments, machine learning component 114 may train a machine learning model to identify personal privacy boundaries within one or more environments. The machine learning model may include machine learning algorithms and pattern recognition models. The machine learning model may include training for developing the necessary algorithms for object detection component 110, image recognition component 112, and risk-based profiling/prediction component 116, and integrating the machine learning and pattern recognition models into the system. For example, the machine learning model may include an ensemble decision tree algorithm (e.g., random forest) for image classification pertaining to personal privacy boundaries, and a risk-based profiling feature powered by a combination of computer vision, natural language processing, and machine learning algorithms. In embodiments, the machine learning model is trained with a large training dataset. This may include gathering or collecting relevant images for training. For example, the system may collect a large dataset of images relevant to the environment in which the robotic device will be navigating, such as images of people, furniture, and other objects. The system may then perform labeling image. For example, the system will label the images with appropriate tags that describe the objects in the images (e.g., distinguishing recognized objects as private, sensitive, hazardous, etc.). This can be done through manual labeling, automated tagging, or natural language processing. The system may train the machine learning model with the labeled images. For example, the system may use the labeled images to train a machine learning model, such as an ensemble decision tree. This model is well suited for the task because it can process large amounts of ordinal data and provides accurate predictions.

In embodiments, the trained machine learning model may be used to make predictions about objects in the images. For example, the machine learning model may be trained to recognize various environments, areas, boundaries, and/or objects that may be classified as sensitive and/or private, such that the given robotic device does not generate data regarding or within a proximity those environments, areas, or objects. In some embodiments, the machine learning model may be refined by evaluating the model's predictions and adjusting the model as needed to improve its accuracy. This can be done by validating the model's predictions against known labels and adjusting the model accordingly.

In embodiments, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

It is noted that FIG. 1 is intended to depict the representative major components of an exemplary robotic device privacy management system 100. In some embodiments, however, individual components may have greater or lesser complexity than as represented in FIG. 1, components other than or in addition to those shown in FIG. 1 may be present, and the number, type, and configuration of such components may vary.

For example, while FIG. 1 illustrates a robotic device privacy management system 100 with a single robotic device privacy manager 102, a single robotic device 120, and a single network 150, suitable computing environments for implementing embodiments of this disclosure may include any number of robotic device privacy management systems, robotic device privacy managers, robotic devices, and networks. The various modules, systems, and components illustrated in FIG. 1 may exist, if at all, across a plurality of robotic device privacy management systems, robotic device assignment managers, robotic devices, IoT devices, and networks.

Figure 2:
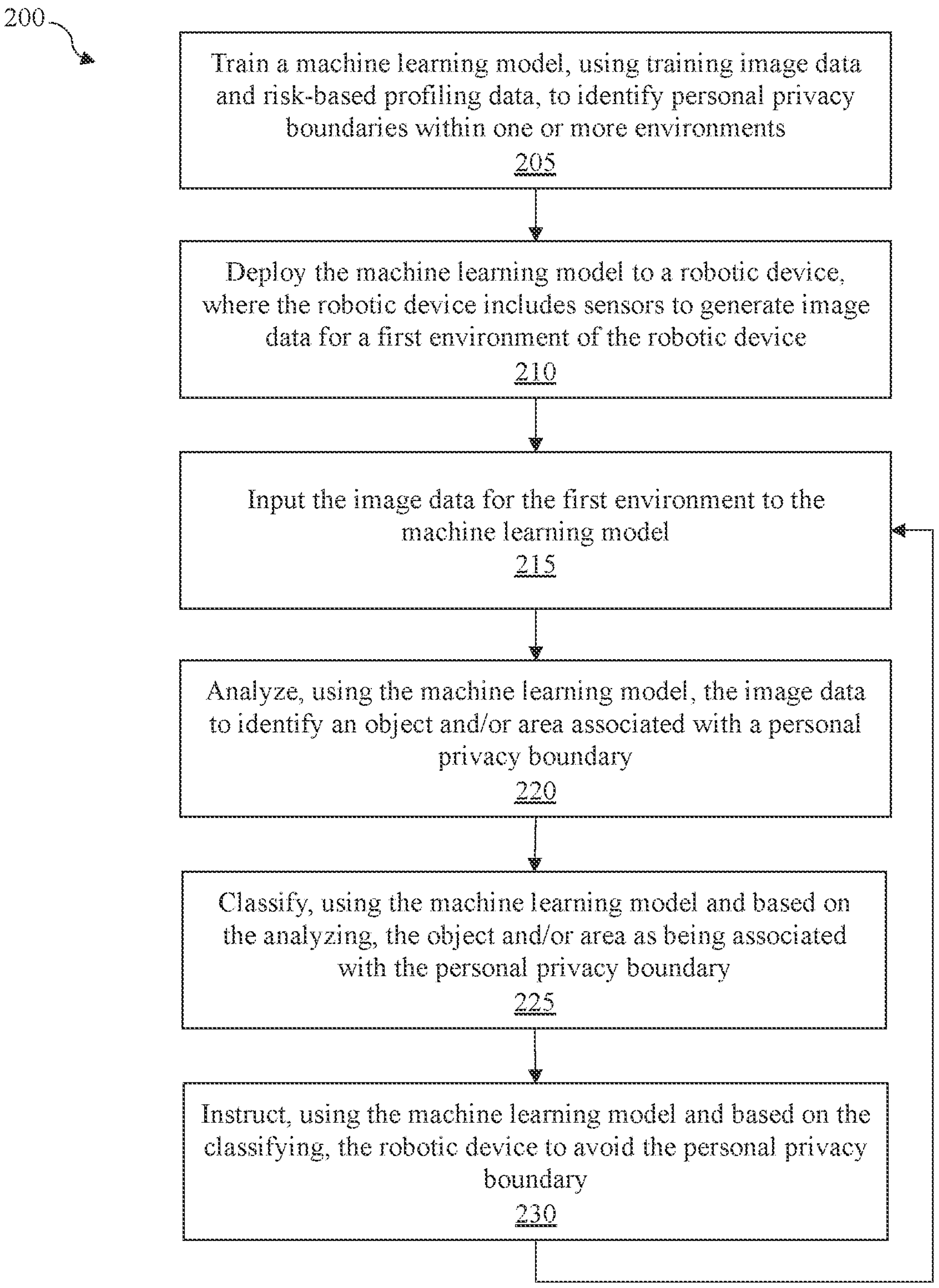
FIG. 2 illustrates a process for preventing robotic device privacy overreach, in accordance with some embodiments of the present disclosure.

Referring now to FIG. 2, shown is an example process 200 for preventing robotic device privacy overreach, in accordance with some embodiments of the present disclosure. The process 200 may be performed by processing logic that comprises hardware (e.g., circuitry, dedicated logic, programmable logic, microcode, etc.), software (e.g., instructions run on a processor), firmware, or a combination thereof. In some embodiments, the process 200 is a computer-implemented process. In embodiments, the process 200 may be performed by processor 106 of robotic device privacy manager 102 exemplified in FIG. 1. In some embodiments, certain steps or sub-steps (robotic tasks) of the process 200 may be performed by a processor (not shown) of robotic device 120 exemplified in FIG. 1.

In embodiments, the process 200 begins by training a machine learning model, using training image data and risk-based profiling data, to identify personal privacy boundaries within one or more environments. This is illustrated at step 205. For example, the machine learning model may include an ensemble decision tree algorithm (e.g., random forest) for image classification pertaining to personal privacy boundaries, and a risk-based profiling feature powered by a combination of computer vision, natural language processing, and machine learning algorithms. In embodiments, the machine learning model is trained with a large training dataset. This may include gathering or collecting relevant images for training. For example, the system may collect a large dataset of images relevant to the environment in which the robotic device will be navigating, such as images of people, furniture, and other objects.

The system may then perform labeling image. For example, the system will label the images with appropriate tags that describe the objects in the images (e.g., distinguishing recognized objects as private, sensitive, hazardous, etc.). This can be done through manual labeling, automated tagging, or natural language processing. The system may train the machine learning model with the labeled images. For example, the system may use the labeled images to train a machine learning model, such as an ensemble decision tree. This model is well suited for the task because it can process large amounts of ordinal data and provides accurate predictions.

In some embodiments, the captured training images are categorized for each environment that they were taken in and correlated with various privacy risks. For example, training images that show work related activities (e.g., confidential documents, computer screens, corporate insignia, business attire, etc.) that may be confidential are classified or identified as higher risk, while other images may show a user in a relaxed environment (e.g., watching television) and be classified as lower risk. Using the classifications from risk-based profiling, the machine learning model may be trained on which situations have personal privacy boundaries.

In some embodiments, the risk-based profiling data may include body language information associated with a personal privacy boundary, and situational awareness information associated with a personal privacy boundary. For example, the machine learning model may be trained with various images that show different states of facial expressions and/or body language that may be correlated with varying levels of risk related to personal privacy. In another example, the machine learning model may be trained to avoid areas based on situational awareness. For example, training may include situational image data showing a user entering a password on a computer screen by recognizing (using natural language processing) the words "enter password" on the computer screen. In such a situation, the robotic device may be trained to stop recording/collecting images or turn its camera in an opposite direction of the user as to not record the user entering keystrokes. In another example, the machine learning model may be trained to use natural language processing algorithms to analyze building maps, blueprints, and/or meeting schedules, such that the robotic is trained to avoid labeled areas that are classified as private or sensitive as it traverses the given environment. For example, the machine learning model may utilize descriptions of various rooms from a building map and instruct a robotic device (e.g., cleaning robotic device) to avoid those areas while a sensitive/confidential meeting is occurring.

The process 200 continues by deploying the machine learning model to a robotic device, wherein the robotic device includes sensors to generate image data for a first environment of the robotic device. This is illustrated at step 210. For example, the machine learning model may be deployed to various types of automated robotic devices such as, a premises monitoring (or security) robotic device, a debris cleaning robotic device (e.g., robotic vacuum, robotic window cleaner, etc.), and an unmanned aerial vehicle (UAV), and the like. It is contemplated that many other robotic devices exist which the present disclosure may be applied, and that these examples are not meant to be limiting. In embodiments, the machine learning model may be deployed to the robotic device via a communicatively connected cloud computing network.

The process 200 continues by inputting the image data for the first environment to the machine learning model. This is illustrated at step 215. For example, a robotic window cleaner equipped with various sensors (e.g., cameras) may generate image data of windows on a building (environment) that are being cleaned or to being cleaned.

The process 200 continues by analyzing, using the machine learning model, the image data to identify an object and/or area associated with a personal privacy boundary. This is illustrated at step 220. Returning to the example above, the machine learning model may analyze the images of the windows and determine that these windows (objects) correspond to an area that is associated with a personal privacy boundary. For example, these windows may be associated with a conference room that is currently occupied by users having a confidential meeting. The machine learning model may correlate the location of the robotic device via sensors and image data with the given conference room based on building maps/blueprints. Further, the personal privacy boundary associated with the area may be determined based on analyzing the image data of the meeting attendees and accessible conference room schedules/details (e.g., timing details and description of confidential meeting).

The process 200 continues by classifying, using the machine learning model and based on the analyzing, the object and/or area as being associated with the personal privacy boundary. This is illustrated at step 225. In embodiments, the machine learning model uses an ensemble decision tree for classification of images pertaining to the personal privacy boundary. Returning to the example above, the machine learning may classify the windows (e.g., object) as being associated with the personal privacy boundary based on the identification of employees within the conference room (area) at the given time (based on image recognition and scheduling details).

The process 200 continues by instructing, using the machine learning model and based on the classifying, the robotic device to avoid the personal privacy boundary. This is illustrated at step 230. In some embodiments, instructing the robotic device to avoid the personal privacy boundary is selected from a group of instructions that include avoiding coming within a predefined distance of the object/area, avoiding crossing the personal privacy boundary associated with the area, avoiding collecting any data with respect to the personal privacy boundary associated with the object and/or area, and avoiding the personal privacy boundary based on a predetermined schedule. Returning to the example, the robotic device will avoid cleaning the windows of the conference room (e.g., personal privacy boundary) at least until the meeting has concluded (e.g., based on the predetermined schedule).

In some embodiments, the process 200 may include steps for identifying, using the machine learning model, a task to be performed by the robotic device at the first environment. If the task is determined to impede and/or cross the personal privacy boundary, the process 200 continues by modifying, using the machine learning model, the task based on the personal privacy boundary. The process may continue by instructing, using the machine learning model, the robotic device to perform the modified task. Returning to the example above, the machine learning model may instruct the robotic window cleaner to clean a set of alternative windows until the conference meeting has been concluded.

In some embodiments, the process 200 may return to step 215, where real-time image data is continuously inputted into the machine learning model. In this way, the machine learning model may continuously make predictions that allow the robotic device to avoid intruding on personal privacy boundaries. In some embodiments, any real-time data generated by the robotic device while performing tasks with respect to the personal privacy boundary may be used as training data for retraining the machine learning model. In this way, the machine learning model can be continuously trained with updated/current training material/data to improve its predictions for preventing the robotic device from intruding on personal privacy boundaries.

Figure 3:
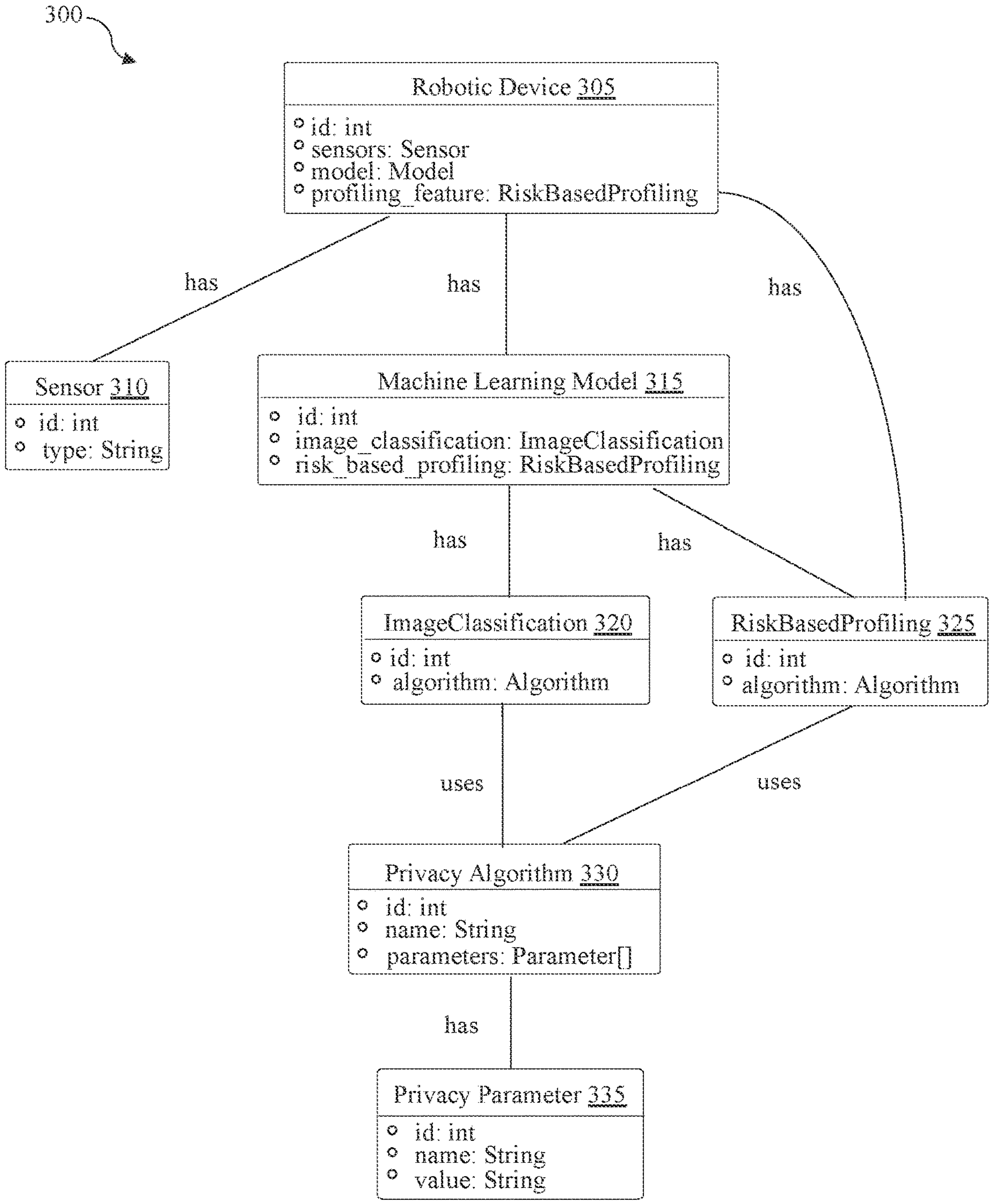
FIG. 3 illustrates an entity relationship diagram for a robotic device, in accordance with some embodiments of the present disclosure.

Referring now to FIG. 3, shown is an entity relationship diagram 300 for a robotic device, in accordance with some embodiments of the present disclosure. In embodiments, robotic device 305 includes sensor(s) 310. Robotic device 305 may be any type of robotic device that gathers/generates data within an environment. For example, robotic device 305 may be a robotic vacuum that patrols the environment while cleaning/sweeping debris. Sensor 310 may include any type of sensor for generating data used for making predictions for preventing robotic device privacy overreach. For example, sensor 310 may be a camera, light, proximity, motion, infrared, and/or audio sensor. In embodiments, robotic device privacy manager 102 may operate/instruct robotic device 305 using a trained machine learning model 315. In some embodiments, machine learning model 315 may be operated locally by the robotic device 315. Machine learning model 315 includes image classification 310 and risk-based profiling 325 algorithms. Using these algorithms, machine learning model 315 may generate a personal privacy algorithm 330. The personal privacy algorithm 330 is configured to generate a set of defined privacy parameters 335 which instruct the robotic device 315 to perform operation related to a personal privacy boundary. In this way, the robotic device 305 may utilize a trained machine learning model to predictively prevent robotic privacy overreach by analyzing images of the robotic device's operating environment and avoiding areas that have been classified as private (e.g., based on risk-based profiling and image classification) which has the potential to revolutionize the development of modern robotics technology. By utilizing advanced algorithms and machine learning technology, robotic devices can be programmed to recognize and respond to various objects in their environment. This allows them to make smart decisions about where they can and cannot go, ensuring that they protect people's privacy and personal safety. This technology has the potential to improve the safety and reliability of robotics technology, paving the way for more advanced robotic devices that can accurately identify and avoid potential risks to their human users.

Referring now to FIG. 4, shown is an example code snippet 400 for implementing a risk-based profiling feature for a robotic device, in accordance with some embodiments of the present disclosure. The code snippet implements a risk-based profiling feature for a robotic device. In the illustrated example, the code snippet imports the necessary modules from Scikit-learn (see code lines 1-5), fetches a set of data from the OpenML dataset (see code lines 7-8), and splits the data into training and testing sets (see code lines 10-11). The Random Forest Classifier is then created with 100 estimators and trained on the training data (see code lines 13-17).

The machine learning model is then used to make predictions on the test data and the accuracy is calculated and printed (see code lines 19-26). This code snippet uses the Random Forest Classifier algorithm, which is suitable for this task since it can process large amounts of ordinal data and provides accurate predictions. The code enables the robot device to accurately identify and avoid potential privacy risks, safety issues, and tripping hazards.

Figure 5:
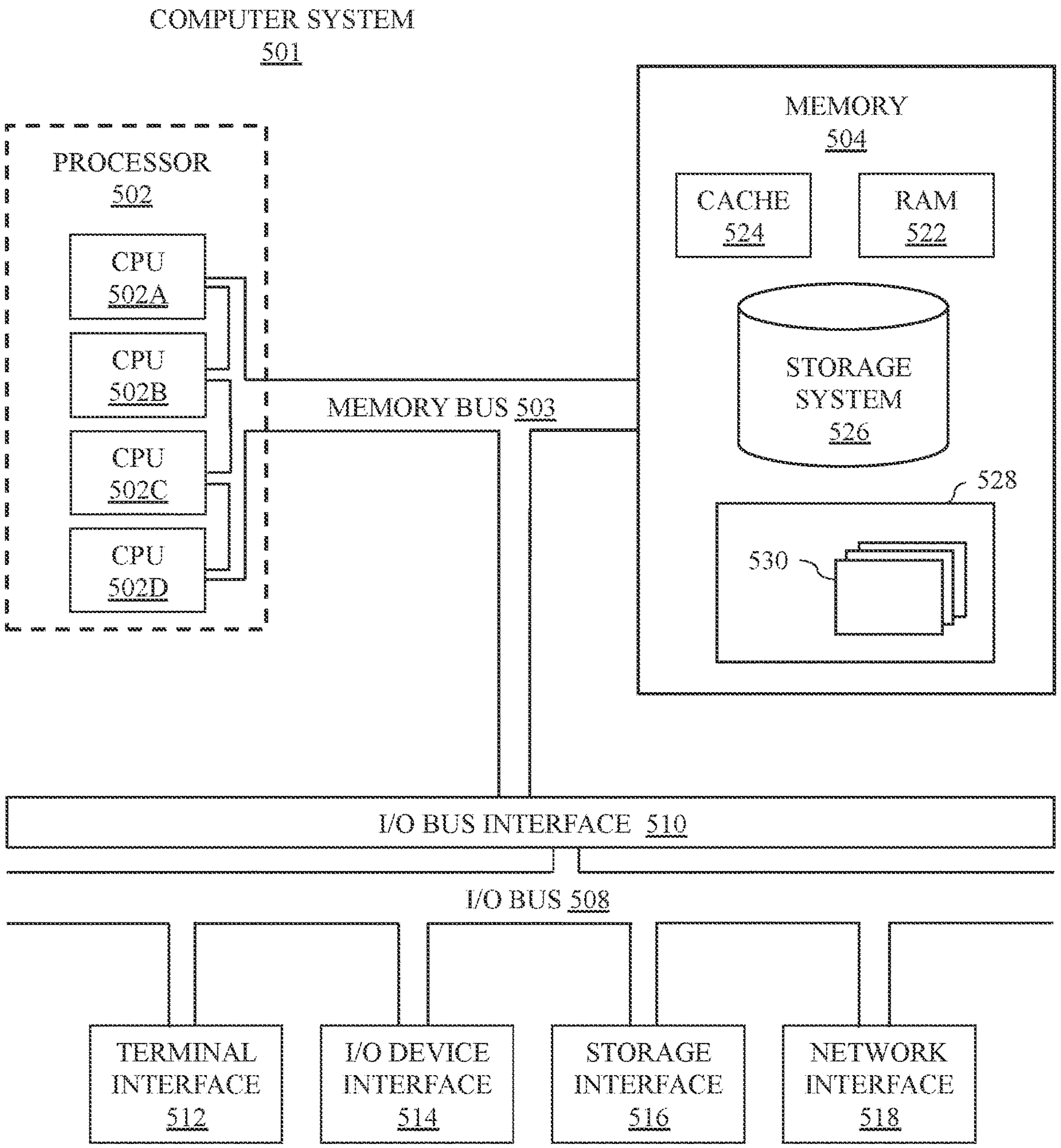
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache. In some embodiments, a processor can include at least one or more of, a memory controller, and/or storage controller. In some embodiments, the CPU can execute the processes included herein (e.g., process 200 as described in FIG. 2). In some embodiments, the computer system 501 may be configured as robotic device privacy management system 100 of FIG. 1.

System memory subsystem 504 may include computer system readable media in the form of volatile memory, such as random-access memory (RAM) 522 or cache memory 524. Computer system 501 may further include other removable/non-removable, volatile/non-volatile computer system data storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 504 can include flash memory, e.g., a flash memory stick drive or a flash drive. Memory devices can be connected to memory bus 503 by one or more data media interfaces. The memory subsystem 504 may include at least one program product having a set (e.g., at least one) of program modules that are configured to carry out the functions of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single units, the computer system 501 may, in some embodiments, contain multiple I/O bus interfaces 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory subsystem 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 528 and/or program modules 530 generally perform the functions or methodologies of various embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pitslands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
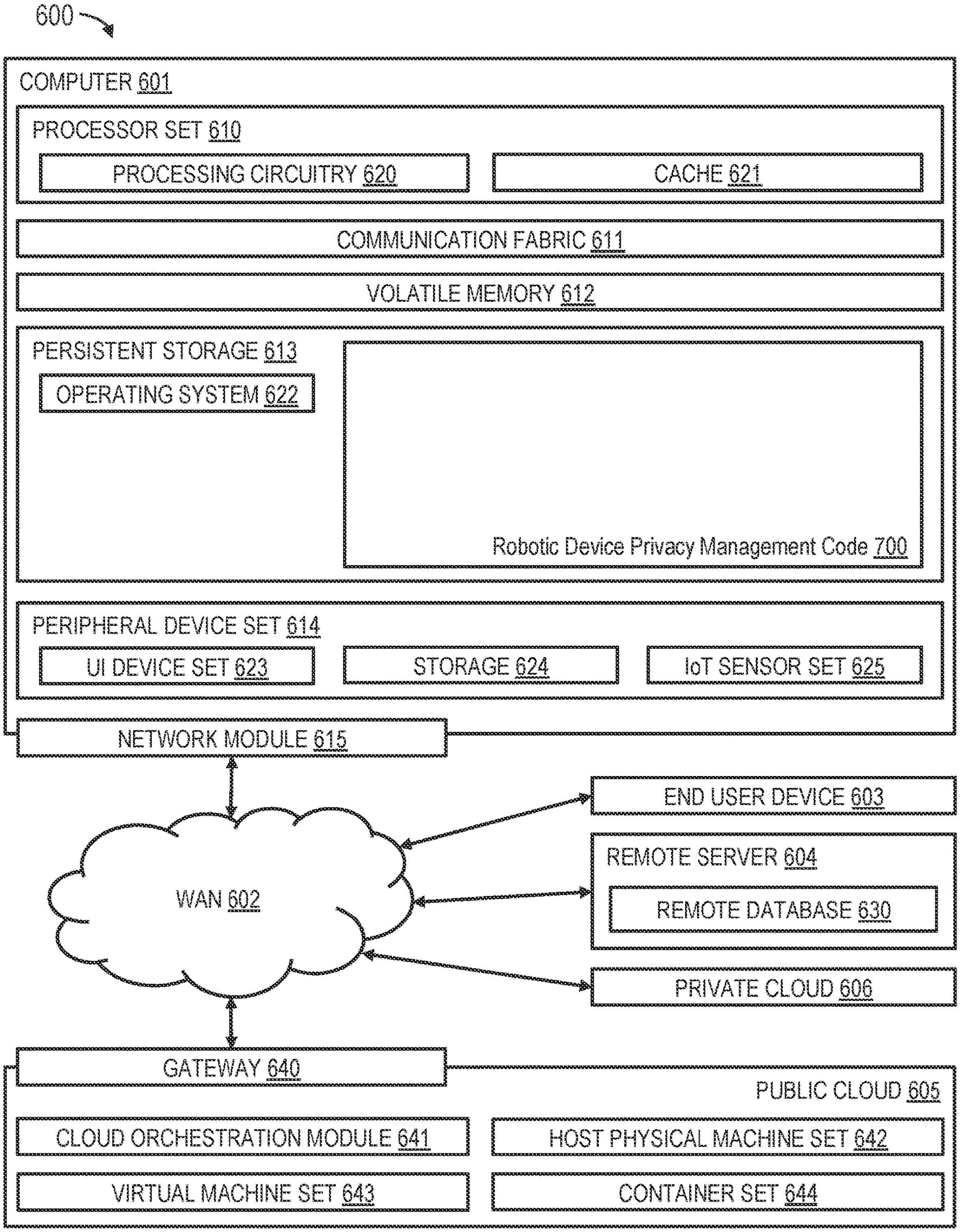
FIG. 6 depicts a schematic diagram of a computing environment for executing program code related to the methods disclosed herein and for predictively preventing robotic device privacy overreach, according to at least one embodiment.

Embodiments of the present disclosure may be implemented together with virtually any type of computer, regardless of the platform is suitable for storing and/or executing program code. FIG. 6 shows, as an example, a computing environment 600 (e.g., cloud computing system) suitable for executing program code related to the methods disclosed herein and for circuit design automation. In some embodiments, the computing environment 600 may be the same as or an implementation of the computing environment of robotic device privacy management system 100.

Computing environment 600 contains an example of an environment for the execution of at least some of the computer code involved in performing the inventive methods, such as robotic device privacy management code 700. The robotic device privacy management code 700 may be a code-based implementation of the robotic device privacy management system 100. In addition to robotic device privacy management code 700, computing environment 600 includes, for example, a computer 601, a wide area network (WAN) 602, an end user device (EUD) 603, a remote server 604, a public cloud 605, and a private cloud 606. In this embodiment, the computer 601 includes a processor set 610 (including processing circuitry 620 and a cache 621), a communication fabric 611, a volatile memory 612, a persistent storage 613 (including operating a system 622 and the robotic device privacy management code 700, as identified above), a peripheral device set 614 (including a user interface (UI) device set 623, storage 624, and an Internet of Things (IoT) sensor set 625), and a network module 615. The remote server 604 includes a remote database 630. The public cloud 605 includes a gateway 640, a cloud orchestration module 641, a host physical machine set 642, a virtual machine set 643, and a container set 644.

The computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 630. As is well understood in the art of computer technology, and depending upon the technology, performance of a computer-implemented method may be distributed among multiple computers and/or between multiple locations. On the other hand, in this presentation of the computing environment 600, detailed discussion is focused on a single computer, specifically the computer 601, to keep the presentation as simple as possible. The computer 601 may be located in a cloud, even though it is not shown in a cloud in FIG. 1. On the other hand, the computer 601 is not required to be in a cloud except to any extent as may be affirmatively indicated.

The processor set 610 includes one, or more, computer processors of any type now known or to be developed in the future. The processing circuitry 620 may be distributed over multiple packages, for example, multiple, coordinated integrated circuit chips. The processing circuitry 620 may implement multiple processor threads and/or multiple processor cores. The cache 621 is memory that is located in the processor chip package(s) and is typically used for data or code that should be available for rapid access by the threads or cores running on the processor set 610. Cache memories are typically organized into multiple levels depending upon relative proximity to the processing circuitry. Alternatively, some, or all, of the cache for the processor set may be located "off chip." In some computing environments, the processor set 610 may be designed for working with qubits and performing quantum computing.

Computer readable program instructions are typically loaded onto the computer 601 to cause a series of operational steps to be performed by the processor set 610 of the computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 621 and the other storage media discussed below. The program instructions, and associated data, are accessed by the processor set 610 to control and direct performance of the inventive methods. In the computing environment 600, at least some of the instructions for performing the inventive methods may be stored in the robotic device privacy management code 700 in the persistent storage 613.

The communication fabric 611 is the signal conduction path that allows the various components of the computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 612 is any type of volatile memory now known or to be developed in the future. Examples include dynamic type random access memory (RAM) or static type RAM. Typically, the volatile memory 612 is characterized by random access, but this is not required unless affirmatively indicated. In the computer 601, the volatile memory 612 is located in a single package and is internal to the computer 601, but, alternatively or additionally, the volatile memory may be distributed over multiple packages and/or located externally with respect to the computer 601.

The persistent storage 613 is any form of non-volatile storage for computers that is now known or to be developed in the future. The non-volatility of this storage means that the stored data is maintained regardless of whether power is being supplied to the computer 601 and/or directly to the persistent storage 613. The persistent storage 613 may be a read only memory (ROM), but typically at least a portion of the persistent storage allows writing of data, deletion of data and re-writing of data. Some familiar forms of persistent storage include magnetic disks and solid-state storage devices. The operating system 622 may take several forms, such as various known proprietary operating systems or open-source Portable Operating System Interface-type operating systems that employ a kernel. The code included in the robotic device privacy management code 700 typically includes at least some of the computer code involved in performing the inventive methods.

The peripheral device set 614 includes the set of peripheral devices of the computer 601. Data communication connections between the peripheral devices and the other components of the computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 623 may include components such as a display screen, speaker, microphone, wearable devices (such as goggles and smart watches), keyboard, mouse, printer, touchpad, game controllers, and haptic devices. The storage 624 is external storage, such as an external hard drive, or insertable storage, such as an SD card. The storage 624 may be persistent and/or volatile. In some embodiments, the storage 624 may take the form of a quantum computing storage device for storing data in the form of qubits. In embodiments where the computer 601 is required to have a large amount of storage (for example, where the computer 601 locally stores and manages a large database) then this storage may be provided by peripheral storage devices designed for storing very large amounts of data, such as a storage area network (SAN) that is shared by multiple, geographically distributed computers. The IoT sensor set 625 is made up of sensors that can be used in Internet of Things applications. For example, one sensor may be a thermometer and another sensor may be a motion detector.

The network module 615 is the collection of computer software, hardware, and firmware that allows the computer 601 to communicate with other computers through the WAN 602. The network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 615 are performed on the same physical hardware device. In other embodiments (for example, embodiments that utilize software-defined networking (SDN)), the control functions and the forwarding functions of the network module 615 are performed on physically separate devices, such that the control functions manage several different network hardware devices. Computer readable program instructions for performing the inventive methods can typically be downloaded to the computer 601 from an external computer or external storage device through a network adapter card or network interface included in the network module 615.

The WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device (EUD) 603 is any computer system that is used and controlled by an end user (for example, a customer of an enterprise that operates the computer 601) and may take any of the forms discussed above in connection with the computer 601. The EUD 603 typically receives helpful and useful data from the operations of the computer 601. For example, in a hypothetical case where the computer 601 is designed to provide a recommendation to an end user, this recommendation would typically be communicated from the network module 615 of the computer 601 through the WAN 602 to the EUD 603. In this way, the EUD 603 can display, or otherwise present, the recommendation to an end user. In some embodiments, the EUD 603 may be a client device, such as thin client, heavy client, mainframe computer, desktop computer and so on.

The remote server 604 is any computer system that serves at least some data and/or functionality to the computer 601. The remote server 604 may be controlled and used by the same entity that operates computer 601. The remote server 604 represents the machine(s) that collect and store helpful and useful data for use by other computers, such as the computer 601. For example, in a hypothetical case where the computer 601 is designed and programmed to provide a recommendation based on historical data, then this historical data may be provided to the computer 601 from the remote database 630 of the remote server 604.

The public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of the public cloud 605 is performed by the computer hardware and/or software of the cloud orchestration module 641. The computing resources provided by the public cloud 605 are typically implemented by virtual computing environments that run on various computers making up the computers of the host physical machine set 642, which is the universe of physical computers in and/or available to the public cloud 605. The virtual computing environments (VCEs) typically take the form of virtual machines from the virtual machine set 643 and/or containers from the container set 644. It is understood that these VCEs may be stored as images and may be transferred among and between the various physical machine hosts, either as images or after instantiation of the VCE. The cloud orchestration module 641 manages the transfer and storage of images, deploys new instantiations of VCEs and manages active instantiations of VCE deployments. The gateway 640 is the collection of computer software, hardware, and firmware that allows the public cloud 605 to communicate through the WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 606 is similar to the public cloud 605, except that the computing resources are only available for use by a single enterprise. While the private cloud 606 is depicted as being in communication with the WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 605 and the private cloud 606 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. In some embodiments, one or more of the operating system 622 and the robotic device privacy management code 700 may be implemented as service models. The service models may include software as a service (Saas), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed.

The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for preventing robotic device privacy overreach, the method comprising:

training a machine learning model, using training image data and natural language processing data, to identify personal privacy boundaries within one or more environments;

deploying the machine learning model to a robotic device, wherein the robotic device includes sensors to generate image data and audio data for a first environment of the robotic device;

analyzing, using the machine learning model, the image data and the audio data to identify a first area that is associated with a personal privacy boundary, wherein the first area is identified as being associated with the personal privacy boundary based on:

determining, using natural language processing, that sensitive information is being discussed within the first area, and determining, using image recognition software, that the image data includes facial expression information associated with an individual located within the first area, and that the facial expression information is correlated with a personal privacy risk of the individual;

classifying, using the machine learning model and based on the analyzing, the first area as being associated with the personal privacy boundary; and programming the robotic device to respond to the first area classified as being associated with the personal privacy boundary, the programming causing the robotic device to dynamically perform one or more operations related to the personal privacy boundary, wherein the one or more operations include the robotic device moving to a second area that is out of range of the sensitive information being discussed within the first area associated with the personal privacy boundary.

2. The computer-implemented method of claim 1, wherein programming the robotic device to respond to the first area associated with the personal privacy boundary further causes the robotic device to dynamically perform an additional operation selected from a group of instructions consisting of:

avoiding coming within a predefined distance of the personal privacy boundary associated with the first area;

avoiding crossing the personal privacy boundary associated with the first area;

avoiding collecting any data with respect to the personal privacy boundary associated with the first area; and avoiding the personal privacy boundary associated with the first area based on a predetermined schedule.

3. The computer-implemented method of claim 1, further comprising:

identifying, using the machine learning model, a task to be performed by the robotic device at the first environment;

modifying, using the machine learning model, the task based on the personal privacy boundary; and instructing, using the machine learning model, the robotic device to perform the modified task.

4. The computer-implemented method of claim 1, wherein the robotic device is selected from a group of robotic devices consisting of:

a premises monitoring robotic device;

a debris cleaning robotic device; and an unmanned aerial vehicle.

5. The computer-implemented method of claim 1, wherein the machine learning model and the robotic device are communicatively connected through a cloud computing network.

6. The computer-implemented method of claim 1, wherein the machine learning model uses an ensemble decision tree for classification of images pertaining to the personal privacy boundary.

7. The computer-implemented method of claim 1, wherein the facial expression information is correlated with the personal privacy risk of the individual if the facial expression information is indicative of the individual not wanting to be near or followed by the robotic device.

8. The computer-implemented method of claim 1, wherein identifying the first area associated with the personal privacy boundary further includes:

determining, using the image recognition software, that the image data includes body language information associated with the individual located within the first area, and that the body language information is correlated with the personal privacy risk of the individual.

9. A system for preventing robotic device privacy overreach comprising:

a processor; and a computer-readable storage medium communicatively coupled to the processor and storing program instructions which, when executed by the processor, cause the processor to perform a method comprising:

training a machine learning model, using training image data and natural language processing data, to identify personal privacy boundaries within one or more environments;

deploying the machine learning model to a robotic device, wherein the robotic device includes sensors to generate image data and audio data for a first environment of the robotic device;

analyzing, using the machine learning model, the image data and the audio data to identify a first area associated with a personal privacy boundary, wherein identifying the first area associated with the personal privacy boundary includes:

determining, using natural language processing, that sensitive information is being discussed within the first area, and determining, using image recognition software, that the image data includes facial expression information associated with an individual located within the first area, and that the facial expression information is correlated with a personal privacy risk of the individual;

classifying, using the machine learning model and based on the analyzing, the first area as being associated with the personal privacy boundary; and programming the robotic device to respond to the first area classified as being associated with the personal privacy boundary, the programming causing the robotic device to dynamically perform one or more operations related to the personal privacy boundary, wherein the one or more operations include the robotic device moving to a second area that is out of range of the sensitive information being discussed within the first area associated with the personal privacy boundary.

10. The system of claim 9, wherein programming the robotic device to respond to the first area associated with the personal privacy boundary further causes the robotic device to dynamically perform an additional operation selected from a group of instructions consisting of:

avoiding coming within a predefined distance of the personal privacy boundary associated with the first area;

avoiding crossing the personal privacy boundary associated with the first area;

avoiding collecting any data with respect to the personal privacy boundary associated with the first area; and avoiding the personal privacy boundary associated with the first area based on a predetermined schedule.

11. The system of claim 9, further comprising:

identifying, using the machine learning model, a task to be performed by the robotic device at the first environment;

modifying, using the machine learning model, the task based on the personal privacy boundary; and instructing, using the machine learning model, the robotic device to perform the modified task.

12. The system of claim 9, wherein the robotic device is selected from a group of robotic devices consisting of:

a premises monitoring robotic device;

a debris cleaning robotic device; and an unmanned aerial vehicle.

13. The system of claim 9, wherein the machine learning model uses an ensemble decision tree for classification of images pertaining to the personal privacy boundary.

14. A computer program product comprising a computer-readable storage medium having program instructions embodied therewith, the program instructions executable by a processor to cause the processor to perform a method for preventing robotic device privacy overreach, the method comprising:

training a machine learning model, using training image data and natural language processing data, to identify personal privacy boundaries within one or more environments;

deploying the machine learning model to a robotic device, wherein the robotic device includes sensors to generate image data and audio data for a first environment of the robotic device;

analyzing, using the machine learning model, the image data and the audio data to identify a first area associated with a personal privacy boundary, wherein identifying the first area associated with the personal privacy boundary includes:

determining, using natural language processing, that sensitive information is being discussed within the first area, and determining, using image recognition software, that the image data includes facial expression information associated with an individual located within the first area, and that the facial expression information is correlated with a personal privacy risk of the individual;

classifying, using the machine learning model and based on the analyzing, the first area as being associated with the personal privacy boundary; and programming the robotic device to respond to the first area classified as being associated with the personal privacy boundary, the programming causing the robotic device to dynamically perform one or more operations related to the personal privacy boundary, wherein the one or more operations include the robotic device moving to a second area that is out of range of the sensitive information being discussed within the first area associated with the personal privacy boundary.

15. The computer program product of claim 14, wherein programming the robotic device to respond to the first area associated with the personal privacy boundary further causes the robotic device to dynamically perform an additional operation selected from a group of instructions consisting of:

avoiding coming within a predefined distance of the personal privacy boundary associated with the first area;

avoiding crossing the personal privacy boundary associated with the first area;

avoiding collecting any data with respect to the personal privacy boundary associated with the first area; and avoiding the personal privacy boundary associated with the first area based on a predetermined schedule.

16. The computer program product of claim 14, wherein the robotic device is selected from a group of robotic devices consisting of:

a premises monitoring robotic device;

a debris cleaning robotic device; and an unmanned aerial vehicle.

* * * * *